United States Patent
Reustle et al.

(10) Patent No.: US 10,794,344 B2
(45) Date of Patent: Oct. 6, 2020

(54) SEALING CARTRIDGE FOR AN INJECTOR OF AN INTERNAL COMBUSTION ENGINE, AND INJECTOR ASSEMBLY FOR AN INTERNAL COMBUSTION ENGINE

(71) Applicant: Dr. Ing. h.c. F. Porsche Aktiengesellschaft, Stuttgart (DE)

(72) Inventors: Albrecht Reustle, Walheim (DE); Gerd Kissner, Gerlingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 103 days.

(21) Appl. No.: 15/954,756

(22) Filed: Apr. 17, 2018

(65) Prior Publication Data

US 2018/0306149 A1 Oct. 25, 2018

(30) Foreign Application Priority Data

Apr. 19, 2017 (DE) ........................ 10 2017 108 270

(51) Int. Cl.
*F02M 55/00* (2006.01)
*F02M 51/06* (2006.01)
(Continued)

(52) U.S. Cl.
CPC ........ *F02M 55/004* (2013.01); *F02M 25/025* (2013.01); *F02M 51/0603* (2013.01);
(Continued)

(58) Field of Classification Search
CPC ............... F02M 55/004; F02M 25/025; F02M 51/0603; F02M 55/025; F02M 61/14;
(Continued)

(56) References Cited

U.S. PATENT DOCUMENTS 4,557,487 A 12/1985 Banas et al.
6,062,200 A * 5/2000 Hofmeister .......... F02M 69/465
123/470
(Continued)

FOREIGN PATENT DOCUMENTS

DE 10 2005 034 689 2/2007
DE 10 2009 029 627 3/2011
(Continued)

OTHER PUBLICATIONS

Japanese Office Action dated Feb. 12, 2019.

*Primary Examiner* — Steven J Ganey
(74) *Attorney, Agent, or Firm* — Gerald E. Hespos; Michael J. Porco; Matthew T. Hespos

(57) ABSTRACT

A sealing cartridge (18) for an injector of an internal combustion engine seals a medium-filled first chamber (6) and a medium-filled second chamber (7). The chambers (6, 7) are between an injector (1) that is movable axially along an injector axis (9) and a housing (2) receives the injector (1). The sealing cartridge (18) is configured to receive the injector (1). The sealing cartridge (18) has at least one seal (11; 20) disposed in a receptacle housing (19) of the sealing cartridge (18). The receptacle housing (19) has a first housing portion (29) configured to receive the seal (11; 20) on the shell face (31) of the receptacle housing (19), and a second housing portion (30) configured to receive the seal (11; 20) on an internal face (25). An injector assembly (38) also is provided and has an injector (1) that is received in the sealing cartridge (18).

26 Claims, 5 Drawing Sheets

(51) Int. Cl.
*F02M 25/025* (2006.01)
*F02M 61/14* (2006.01)
*F02M 55/02* (2006.01)

(52) U.S. Cl.
CPC .......... *F02M 55/025* (2013.01); *F02M 61/14* (2013.01); *F02M 2200/16* (2013.01); *F02M 2200/21* (2013.01); *F02M 2200/856* (2013.01); *Y02T 10/121* (2013.01)

(58) Field of Classification Search
CPC .......... F02M 2200/16; F02M 2200/21; F02M 2200/856; Y02T 10/121
USPC ............... 239/88–92, 600; 123/469, 470
See application file for complete search history.

(56) References Cited

U.S. PATENT DOCUMENTS

| | | | | |
|---|---|---|---|---|
| 6,431,151 | B1* | 8/2002 | Gmelin | F02M 61/14 |
| | | | | 123/470 |
| 7,934,488 | B2* | 5/2011 | Biasci | F02M 55/025 |
| | | | | 123/470 |
| 2005/0115546 | A1 | 6/2005 | Liskow | |
| 2007/0033892 | A1 | 2/2007 | Unruh | |

FOREIGN PATENT DOCUMENTS

| | | |
|---|---|---|
| DE | 10 2014 225 925 | 6/2016 |
| JP | 1-108491 | 4/1989 |
| JP | 2004-513298 | 4/2004 |
| JP | 2004-138155 | 5/2004 |
| JP | 2014-81073 | 5/2014 |
| WO | 2004/015263 | 2/2004 |

* cited by examiner

SEALING CARTRIDGE FOR AN INJECTOR OF AN INTERNAL COMBUSTION ENGINE, AND INJECTOR ASSEMBLY FOR AN INTERNAL COMBUSTION ENGINE

CROSS REFERENCE TO RELATED APPLICATION

This application claims priority under 35 USC 119 to German Patent Appl. No. 10 2017 108 270.0 filed on Apr. 19, 2017, the entire disclosure of which is incorporated herein by reference.

BACKGROUND

Field of the Invention

The invention relates to a sealing cartridge for an injector of an internal combustion engine, and to an injector assembly for an internal combustion engine.

Description of the Related Art

Injectors, such as piezo injectors or multi-bore injectors, are provided for injecting fuel in internal combustion engines. The internal combustion engine has one injector per cylinder. Each injector is received in a housing of the internal combustion engine, and the housing generally is referred to as a fuel rail. A sealing assembly is provided between the housing and the injector for sealing in relation to vapors as well as leakages and return flows of fuel, which with the aid of the injector is injected into a combustion chamber of the internal combustion engine.

DE 10 2014 225 925 A1 discloses a sealing assembly for sealing two chambers that are filled with media. A movable component is received in the sealing assembly. A sealing means is disposed in a receptacle housing that is placed into a housing.

DE 10 2005 034 689 A1 discloses a sealing assembly for an injector of an internal combustion engine and has: a head assembly with a support part having openings for the passage of connector pins, external annular seals along the circumferential region of the head assembly, and internal annular seals that enclose a connector pin.

DE 10 2009 029 627 A1 discloses an injector for an internal combustion engine. The injector has a sealing assembly with a metal ring that is partially sheathed by plastic.

WO 2004 015 263 A1 discloses an injector for an internal combustion engine. Two annular seals are spaced apart by an intermediate ring and are configured for sealing the fuel valve in relation to a valve receptacle.

It is an object of the invention to provide an improved sealing cartridge for an injector of an internal combustion engine. It is a further object to provide an injector assembly for an internal combustion engine.

SUMMARY

A sealing cartridge for an injector of an internal combustion engine is provided for sealing a medium-filled first chamber and a medium-filled second chamber. The chambers are configured between an injector that is movable axially along an injector axis and a housing that receives the injector. The sealing cartridge is configured for receiving the injector and comprises at least one sealing means disposed in a receptacle housing of the sealing cartridge. The receptacle housing has a first housing portion configured to receive the sealing means on the shell face of the receptacle housing, and a second housing portion configured to receive the sealing means on the internal face of the receptacle housing. This ability to position the sealing means either on the shell face or on the internal face along the injector axis achieves a preferred sealing effect with a type of quasi labyrinth seal, since a potential transfer of medium from the first chamber to the second chamber and vice versa is protracted.

The sealing means may be received in the first housing portion, and a further sealing means may be received in the second housing portion. Thus, tightness in relation to the housing that receives the sealing cartridge can be configured in the first housing portion, and tightness between the injector and the sealing cartridge can be configured in the second housing portion. The advantage of this radially offset sealing assembly achieves a particularly secure seal while using standard sealing elements.

A chamfer may be configured on the first housing end of the receptacle housing on the shell face of the receptacle housing. This chamfer leads to an improved introduction of the sealing cartridge into a respective receptacle opening on a fuel rail with a reduced risk of canting.

The first housing portion has a first receptacle groove, and the second housing portion has a second receptacle groove to ensure that the sealing means is disposed in a secure manner in the receptacle housing. Thus, the sealing means is received in an axially secure manner along a longitudinal axis of the receptacle housing.

A finisher ring may close the receptacle grooves in the axial direction of the receptacle housing. Thus, the receptacle housing can be equipped in a simple manner with annular seals and possibly with support rings if the first receptacle groove and/or the second receptacle groove are open on one side in the axial direction. After the receptacle housing has been equipped with the seals, the respective receptacle groove is closed with the aid of the finisher ring. More particularly, the finisher ring is fixed immovably in the receptacle housing in a press-fit and/or materially integral manner, for example being laser-welded to said receptacle housing. Additionally or alternatively, a captive round retaining ring could be inserted into a further receptacle groove.

The finisher ring may be fixed to the receptacle housing with the aid of a securing element. Thus, the finisher ring is disposed in a secure manner in the receptacle housing without any potential loosening caused by thermal or mechanical influences.

The finisher ring may have a detent for limiting axial movement on the receptacle housing. Thus, the finisher ring cannot be joined too deep into the receptacle housing during the pre-assembly of the sealing cartridge.

The finisher ring may be partially received in the receptacle housing with the aid of a press fit. The possibility of securely receiving the finisher ring in the receptacle housing during the pre-assembly is thus provided. Thus, the finisher ring can be configured for improved disassembly of the sealing cartridge. The finisher ring may be press fit into the receptacle housing. Thus, the finisher ring is small in comparison with the receptacle housing and cost efficiencies are achieved.

The finisher ring may be embodied for the securing ring to be arrested in a self-acting manner. Thus, the assembly of the sealing cartridge in the housing is facilitated.

The finisher ring may have an external groove with a variable groove depth. Thus, during assembly, the securing ring is quasi forced to assume its terminal position.

The finisher ring may be embodied to receive the securing ring in a secure manner during the pre-assembly This can be the case, for example, in that the finisher ring is configured only in portions.

The securing ring may be an open circlip, and may have ends that can be gripped by tool so that the securing ring can be compressed and moved from the secure position to enable disassembly. Thus, the sealing cartridge can be removed from the housing in a simple manner.

The shell face of the receptacle housing may have an arrester shoulder. The arrester shoulder serves as a detent for the receptacle housing in the assembly of the sealing cartridge to achieve a positionally accurate arrangement of the sealing cartridge.

The sealing means may be disposed in the receptacle housing with a support element, such as a support disk. The support disk may be movable axially. The rail pressure that is permanently present between the injector and the housing due to the pressure of the fuel or other medium has values that lead to a deformation of the O-rings or other such sealing means. Thus, the sealing effect of the sealing means is lost. The support element prevents deformation of the sealing means so that a reliable sealing of the sealed location can be achieved at high pressures.

The support element may have a radial slot to simplify assembly. Thus, the support element can be widened or compressed during assembly and will contract or expand again after being positioned.

At least one positioning element may be receivable on the shell face so that the receptacle housing can be received in a secure manner in a housing of the internal combustion engine. Thus, the shell face may have a means, for example a groove, that can receive the positioning element. The positioning element can be received in a captive and/or non-captive manner.

The sealing means and the receptacle housing collectively form a sealing cartridge that is ready for assembly. This pre-assembled sealing cartridge is independent of the internal combustion engine and the fuel rail to facilitate the completion and tightness testing of said sealing cartridge. The assembly process of the individual components also can be checked visually in a simple manner.

A tightness test also is possible in the assembly in the fuel rail, that is to say in the correspondingly provided housing of the internal combustion engine.

Further advantages are the use of simple and proven components, such as support rings, annular seals, O-rings, turned parts, and securing rings. A slotted support disk such as is in the case of a piezo and/or multi-bore injector, can be used.

A second aspect of the invention relates to an injector assembly for an internal combustion engine. The injector assembly comprises an injector and a housing of the internal combustion engine. The injector is configured to be receivable in a receptacle opening of the housing. A fuel supply chamber may be between the injector and the housing and may have a fuel supply opening for supplying fuel to the injector. A sealing means seals the fuel supply chamber in a fluid-tight manner in relation to a receptacle chamber in which the injector is received. The injector is capable of being positioned in the above-described sealing cartridge.

A further advantage is a cost-effective production in which the sealing cartridge can be introduced into the housing in a simple manner as compared with a complex assembly of the sealing assembly of the prior art. A further cost reduction is possible due to the sealing cartridge can be produced independently of the fuel rail. Apart from independent manufacturers, dissimilar materials can also be used. Thus, investment costs and individual material costs can be reduced.

The housing may have at least one detent against which the sealing cartridge can be positioned precisely The sealing cartridge may be configured to be received in a captive and/or non-captive manner in the housing.

Further advantages, features, and details of the invention are derived from the description hereunder of preferred exemplary embodiments, and by means of the drawings. The features and combinations of features mentioned in the description above, and the features and combinations of features mentioned in the description of the figures hereunder and/or shown individually in the figures are able to be applied not only in the respective combination stated, but also in other combinations or individually, without departing from the scope of the invention. Identical reference signs are assigned to the same or functionally equivalent elements.

DETAILED DESCRIPTION

Figure 1:
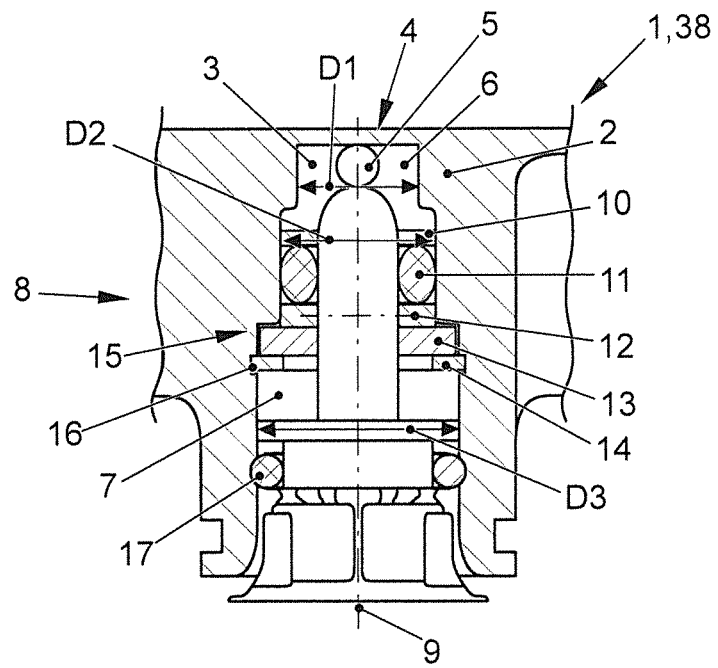
FIG. 1 shows an injector assembly for an internal combustion engine according to the prior art, in a section.

An injector assembly 38 that is configured according to the prior art, having an injector 1, for an internal combustion engine (not illustrated in more detail) is designed according to FIG. 1. The injector 1, which is configured in the form of a piezo or a multi-bore injector, is received in a housing 2 in a receptacle opening 3. The housing 2 is in the form of a rail, a so-called fuel rail, and has receptacle openings 3 according to the number of cylinders of the internal combustion engine. Each receptacle opening 3 is equipped with one of the injectors 1.

One injector end 4 of the injector 1 face away from a needle of the injector 1 that is provided for opening or closing a nozzle opening. Fuel that flows through the injector 1 is injected into a combustion chamber of the internal combustion engine when the nozzle opening is released by the needle. The fuel is supplied with air and is combusted in the combustion chamber.

A fuel supply opening 5 is formed at the injector end 4 in the housing 2, and the fuel is supplied to the injector 1 at a very high pressure by way of the fuel supply opening 5. A sealing assembly 8 is provided so that a fuel supply chamber 6 of the receptacle opening 3 that has the fuel supply opening 5 can be sealed in relation to the receptacle chamber 7 of the receptacle opening 3 with the injector 1 received therein.

The receptacle opening 3 is configured to have dissimilar diameters D1, D2, D3, said dissimilar diameters D1, D2, D3 taking into account an assembly requirement of the sealing assembly 8. The fuel supply chamber 6 has the first diameter D1, which is smaller than the second diameter D2, and which, in turn, is again smaller than the third diameter D3. Thus, a cascade-type receptacle opening 3 is configured for receiving the components of the sealing assembly 8.

The sealing assembly 8 of the prior art, when viewed in the axial direction along an injector axis 9, proceeding from the fuel supply opening 5, comprises a first support disk 10, a first annular seal 11 adjacent to the support disk 10 and a second support disc 12 on the side of the first annular seal 11 that faces away from the first support disk 10. A third support disk 13 is mounted axially at least on one side on a securing ring 14 for additional securing. The securing ring 14 axially mounts the support disks 10, 12, 13 and the first annular seal 11.

The first support disk 10, the first annular seal 11, and the second support disk 12 are disposed in a portion of the receptacle chamber 7 that has the second diameter D2, which is larger than the first diameter D1 and smaller than the third diameter D3. The third diameter D3 is larger than the second diameter D2. Thus, a shoulder 15 in the form of a detent is formed on which the third support disk 13 is positioned. The support disks 10, 12, 13 are axially movable.

The third support disk 13 does not mandatorily have to be secured by way of a disk-shaped securing ring 14 with a rectangular cross-section as in FIG. 1. The securing ring 14 can have a round cross-section.

The securing ring 14 is received to be movable in a groove 16 in that portion of the receptacle chamber 7 that has the third diameter D3 for axially securing the support disks 10, 12, 13 and the annual seal 11.

The injector 1 has a second annular seal 17 on a side of the securing ring 14 that faces away from the third support disk 13. The second annular seal 17 is provided as an additional seal should a leakage of fuel from the sealing assembly 8 arise.

The components of the sealing assembly 8 are placed sequentially into the receptacle opening 3 before the injector 1 is incorporated. The receptacle opening 3, by virtue of the dissimilar diameters D1, D2, D3 that are required for the assembly, is to be produced in a multi-stage production method.

Figure 2:
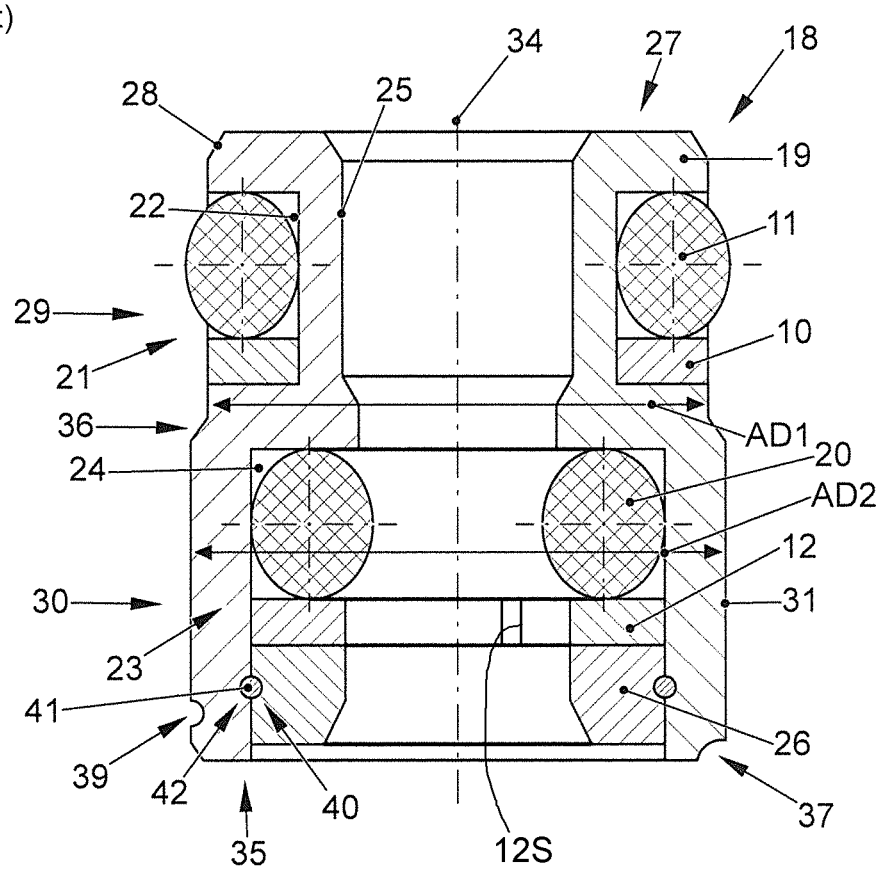
FIG. 2 shows a sealing cartridge according to the invention for an injector, in a section.

The injector assembly 38 according to one exemplary embodiment of the invention is illustrated in FIG. 2.

The sealing cartridge 18 has a receptacle housing 19 that is configured in the manner of a hollow cylinder. The receptacle housing 19 is designed for receiving annular seals, i.e. the first annular seal 11 and a third annular seal 20, and support disks, i.e. the first support disk 10 and the second support disk 12. The receptacle housing 19 is configured to extend along the longitudinal axis 34 that is coaxial with the injector axis 9. The receptacle housing 19 has a first housing end 27 and a second housing end 35.

A first seal group 21 is formed by the first annular seal 11 and the first support disk 10 and is received in a first receptacle groove 22 that is formed on a shell face 31 of the receptacle housing 19. A second seal group 23 is formed by the third annular seal 20 and the second support disk 12 and is received in a second receptacle groove 24 that is formed in an internal face 25 of the receptacle housing 19. The second support disk 12 may have a radial slot 12S to simplify assembly. Thus, the support disk 12 can be compressed during assembly and will expand again after being positioned. The second receptacle groove 24, for simplified assembly, is open on one axial end, and the secured positioning of the second seal group 23 is achieved by a finisher ring 26 that is received so as to be immovable on the second housing end 35 of the receptacle housing 19. The finisher ring 26 in the present exemplary embodiment is press-fit. However, the finisher ring 26 can also be laser-welded and/or caulked and/or fixed by way of a captive securing ring 41 in a fourth receptacle groove 40. The internal face 25 preferably has a sixth receptacle groove 42 for receiving the securing ring 41.

The finisher ring 26 and/or a further finisher ring could just as well be disposed on the first housing end 27 so that the first receptacle groove 22 is open so as to face away from the second receptacle groove 24. This could facilitate the assembly of the first seal group 21; however, in order for the tightness to be provided, at least one materially integral connection between the receptacle housing 19 and the finisher ring that is placed on the first housing end 27 would have to be used.

The two seal groups 21, 23 are positioned to be mutually offset both axially and radially to achieve a secure sealing of the fuel supply chamber 6. The receptacle housing 19 by way of the two seal groups 21, 23 can be subdivided into a first housing portion 29 that receives the first seal group 21 and a second housing portion 30 that receives the second seal group 23.

The first seal group 21 is disposed in the first groove 22 formed on the shell face 31, so as to face the fuel supply opening 5, since a transfer of fuel from the fuel supply chamber 6 by way of the shell face 31 thus already is prevented.

Figure 3:
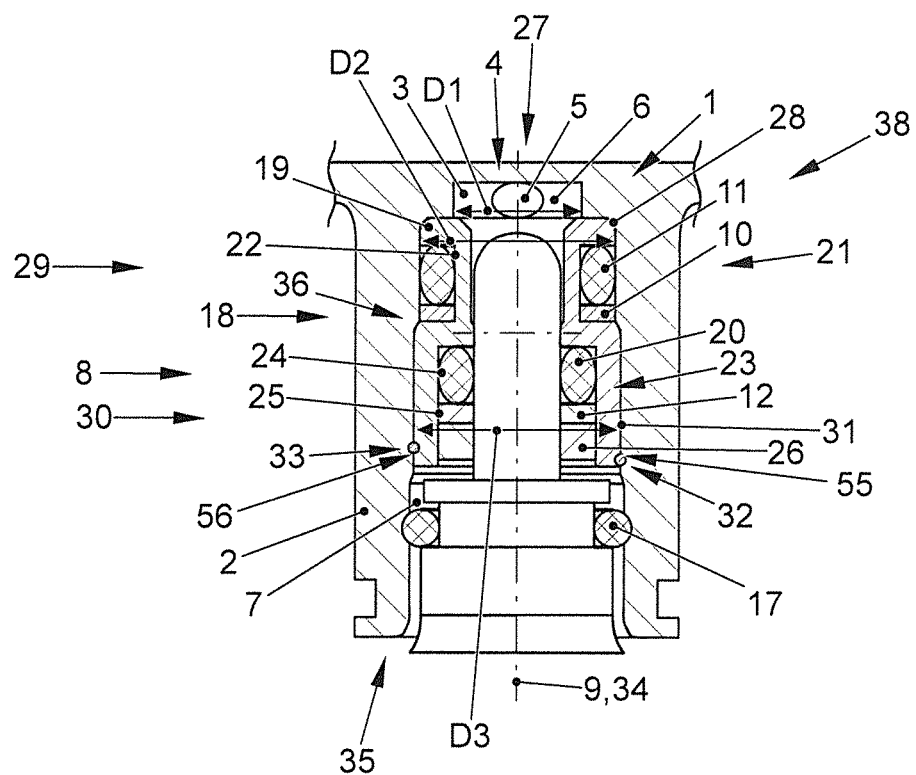
FIG. 3 shows an injector assembly according to the invention for an internal combustion engine, in a section.

The injector assembly 38 according to the invention for an internal combustion engine is illustrated in a section in FIG. 3. The injector 1 is positioned so as to be central in the sealing cartridge 18.

The receptacle housing 19 has a first housing end 27 with a chamfer 28 for the improved introduction of the sealing cartridge 18 into the receptacle opening 3. For a precise positioning, an arrester shoulder 36 is provided by the two dissimilar external diameters AD1, AD2 on the shell face 31 of the receptacle housing 19.

A first positioning element 32 is provided on the shell face 31 on the second housing end 35 so that the sealing cartridge 18 can be positioned securely in the receptacle opening 3. The first positioning element 32 is disposed in a third receptacle groove 37 of the receptacle housing 19 and is in the form of a snap ring. The third receptacle groove 37 is open on one side, i.e. at the second housing end 35, in such a manner that the first positioning element 32 in the case of a disassembly can be readily removed by way of an axial displacement.

A second positioning element 33 is disposed captively in a fourth receptacle groove 39 so that the sealing cartridge 18 also can be positioned in a secure manner. The second positioning element 33 also is a snap ring. The two positioning elements 32, 33 could have any other form of a securing ring. Likewise, only the first positioning element 32, or only the second positioning element 33, could be provided for the sealing cartridge 18 to be securely positioned. The two positioning elements 32, 33 are received in each case in one housing groove, i.e. a first housing groove 55, and in a second housing groove 56, respectively.

Figure 4:
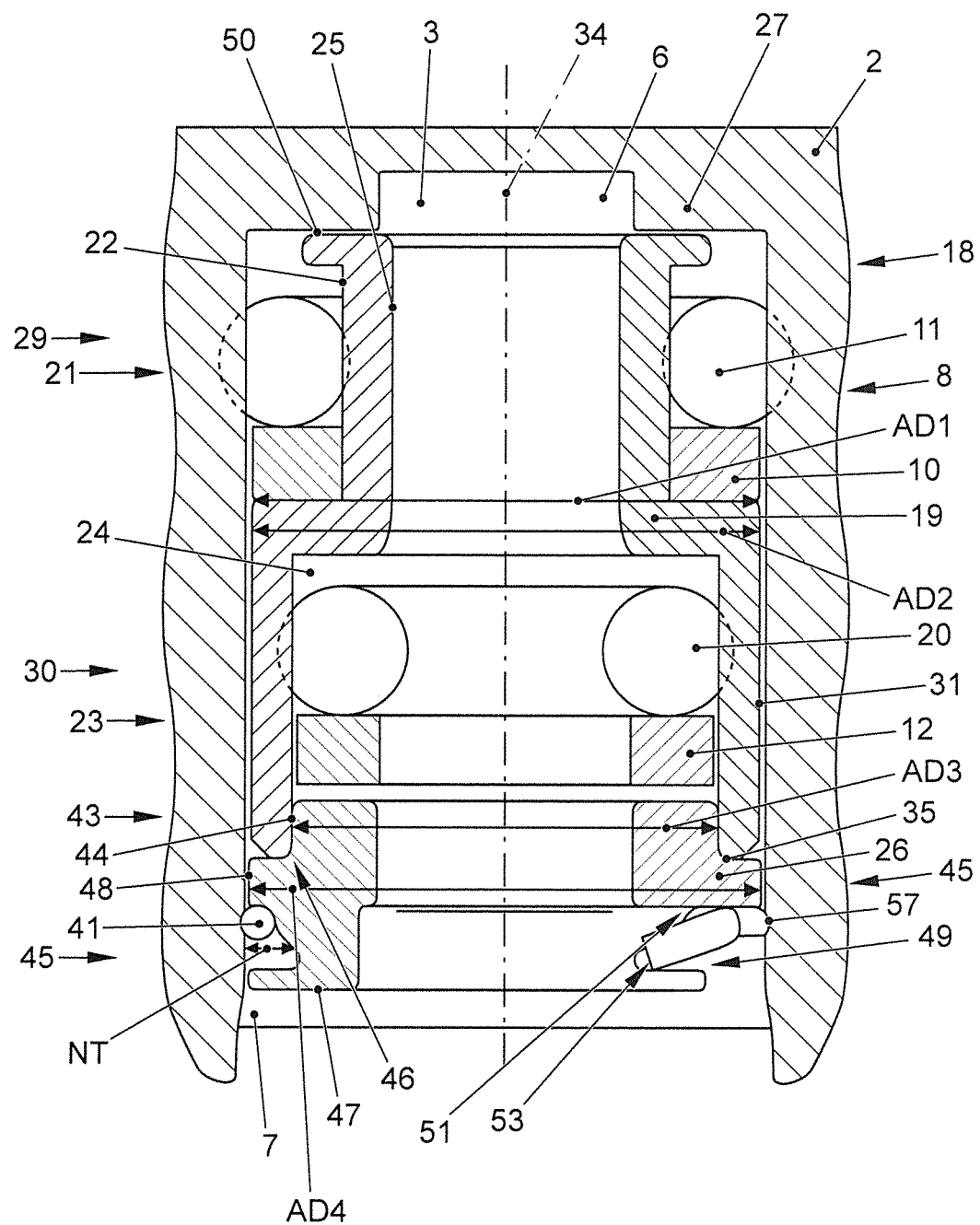
FIG. 4 shows the sealing cartridge according to the invention in a further exemplary embodiment in a housing, in a section.

The sealing cartridge 18 according to the invention in a further exemplary embodiment is illustrated in a longitudinal section along the longitudinal axis 34 in FIG. 4. The sealing cartridge 18 is located securely in the housing 2 with the aid of the securing ring 41.

In this further exemplary embodiment, the finisher ring 26 is configured for the securing ring 41 during the assembly to be arrested in a self-acting manner in a third housing groove 57 in the housing 2. The finisher ring 26 is fixed to the receptacle housing 19 with the aid of the securing ring 41. More particularly, prior to the assembly of the sealing cartridge 18, the finisher ring 26 is secured to the receptacle housing 19 by the pre-tensioned securing ring 41 that is configured from a spring wire.

The finisher ring 26 in this further exemplary embodiment is only partially received in the receptacle housing 19. To this end, a first ring portion 43 of the finisher ring 26 has a third external diameter AD3 for providing a press fit with the receptacle housing 19, and a first external face 44 of the finisher ring 26 is disposed to be opposite the internal face 25 of the receptacle housing 19.

A second ring portion 45 that adjoins the first ring portion 43 has a fourth external diameter AD4 that corresponds to the second external diameter AD2 of the receptacle housing 19. This is to be recommended for a cost-effective injector assembly 38 to be provided, since in this case the receptacle chamber 7 for receiving the sealing cartridge 18, while considering the fuel supply chamber 6, is to be configured in the form of a simple cylindrical opening in the housing 2.

A detent 46 in the form of a shoulder for the axial arresting on the receptacle housing 19 is configured with the aid of the two dissimilar external diameters AD3, AD4. The detent 46 in the assembly of the finisher ring 26 serving for the finisher ring 26 to rest in the manner of a detent on the second housing end 35. This further means that the second housing end 35 in the further exemplary embodiment is not an overall housing end 47 of the sealing cartridge 18, but that the overall housing end 47 in this case is formed by the finisher ring 26.

The finisher ring 26 on the second ring portion 45 thereof has a second external face 48 with an external groove 49 in which the securing ring 41 is received. The external groove 49 has a variable groove depth NT to arrest the securing ring 41 in a self-acting manner during the assembly of the sealing cartridge 18 in the housing 2. In this further exemplary embodiment, the groove depth NT proceeding from a side of the external groove 49 that is configured to face the receptacle housing 19 is embodied to be enlarged in the axial direction along the longitudinal axis 34. This means in other words, that a greatest groove depth NTg is embodied to face the overall housing end 47. The smallest groove depth NTk is configured to face the receptacle housing 19.

In the further embodiment illustrated, the region of the external groove 49 that faces the receptacle housing 19 is at least partially complementary to the securing ring 41 for securely receiving the securing ring 41. The variable groove depth NT ensures that the securing ring 41 in an assembly of the sealing cartridge 18 is first pre-tensioned in the region of the greatest groove depth NTg, since the ring diameter RD of the securing ring 41 is larger than the fourth external diameter AD4, the securing ring 41 in the case of an exact positioning of the sealing cartridge 18 finally snap-fitting into the region of the external groove 49 having the small groove depth NTk, as soon as said sealing cartridge 18 is disposed to be opposite the third housing groove 57 of the housing 2.

A minimal tolerance gap 50 is provided between the housing 2 and the receptacle housing 19 so that potential tolerances can be equalized in a self-acting manner in the production of the housing 2 and of the sealing cartridge 18.

Figure 5:
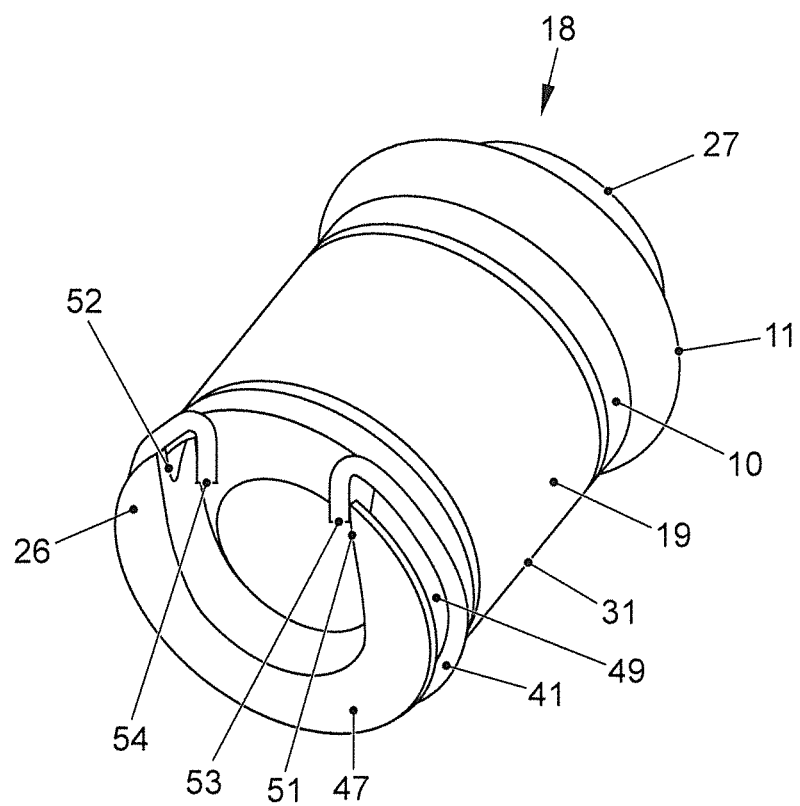
FIG. 5 shows the sealing cartridge according to FIG. 4 in a perspective view.
Figure 7:
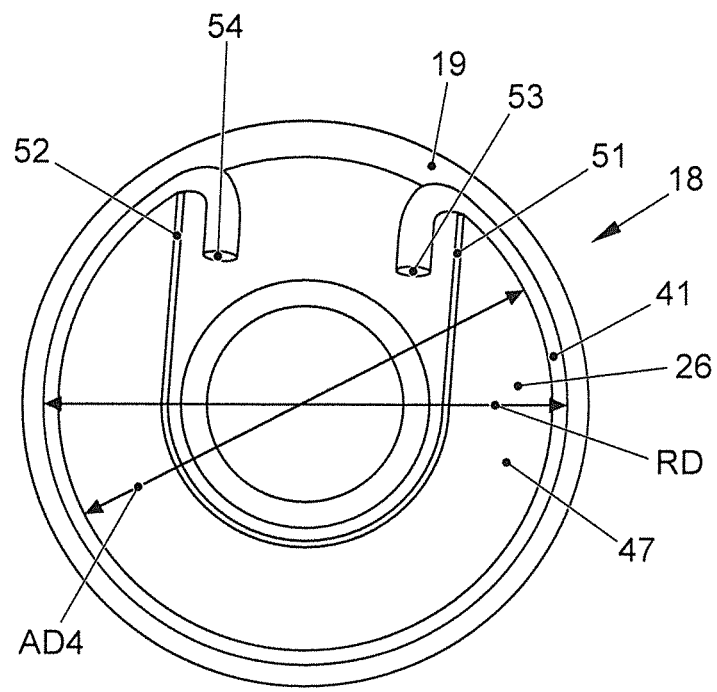
FIG. 7 shows the sealing cartridge according to FIG. 4 in a view from below.

The sealing cartridge 18 of the further exemplary embodiment is illustrated in a perspective view, looking toward the overall housing end 47, in FIG. 5. The second ring portion 45 is not configured on the entire circumference, as said second ring portion 45 has a first ring end 51 and a second ring end 52, said ends being mutually spaced apart. The second ring portion 45 in a view from below according to FIG. 7 is thus designed in a quasi U-shape. The securing ring 41 can be an open circlip with two ring ends, i.e. a first securing ring 53 and a second securing ring 54, that can be gripped and compressed by a tool for disassembly. The securing ring 41 then slides out of the third housing groove 57 into the region of the external groove 49 having the greater groove depth NTg, and the securing cartridge 18 is unlocked. The securing cartridge 18 thus can be removed from the housing 2 without damage, and consumable parts such as the annular seals 11, 20 can be replaced.

Figure 6:
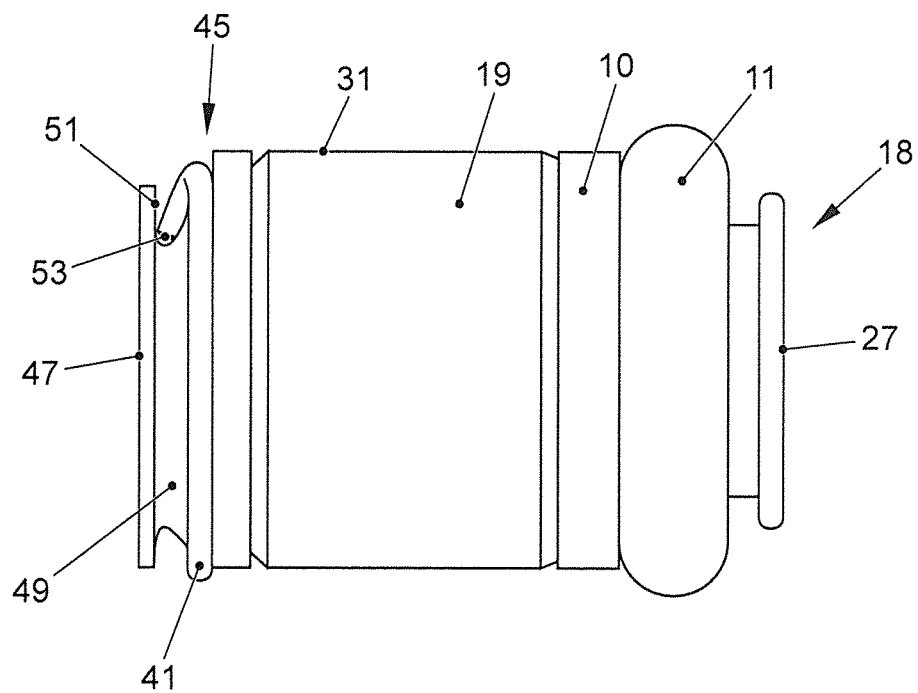
FIG. 6 shows the sealing cartridge according to FIG. 4 in a side view.
Figure 8:
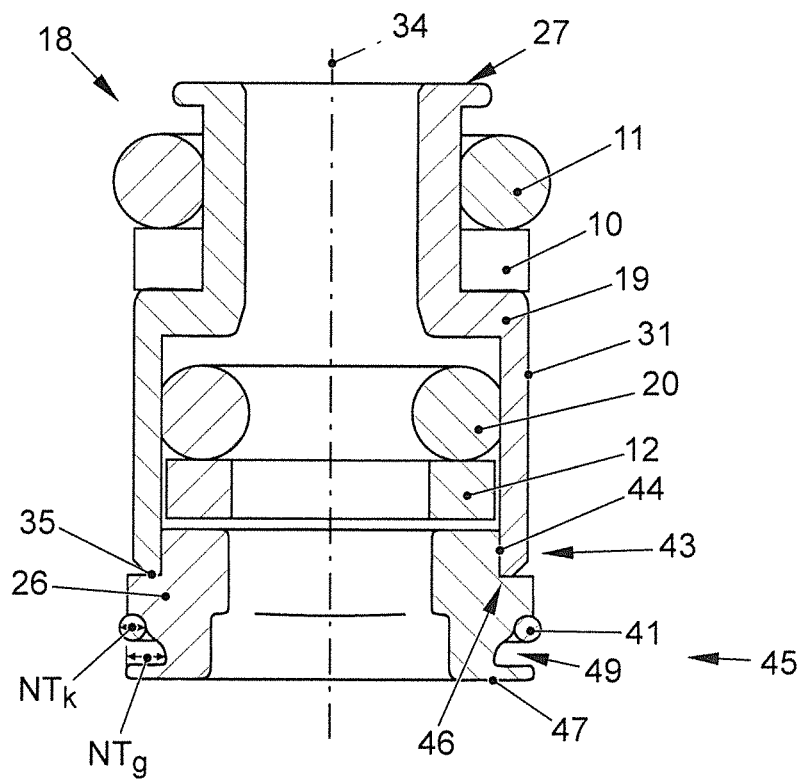
FIG. 8 shows the sealing cartridge according to FIG. 4, in a longitudinal section.

The sealing cartridge 18 of the further exemplary embodiment also is illustrated in a side view in FIG. 6 and in a longitudinal section in FIG. 8.

What is claimed is:

1. A sealing cartridge for an injector of an internal combustion engine, wherein the sealing cartridge is provided for sealing a medium-filled first chamber and a medium-filled second chamber, the chambers being configured between an injector that is movable axially along an injector axis and a housing that receives the injector, the sealing cartridge being configured to receive the injector, the sealing cartridge comprises a receptacle housing, wherein
the receptacle housing has a first housing portion configured to receive a first seal on a shell face of said receptacle housing, and a second housing portion configured to receive a second seal on an internal face.

2. The sealing cartridge of claim 1, wherein the sealing cartridge has a chamfer on the shell face at a first housing end.

3. The sealing cartridge of claim 1, wherein the first housing portion has a first receptacle groove, and the second housing portion has a second receptacle groove.

4. The sealing cartridge of claim 1, further comprising an arrester shoulder on the shell face of the receptacle housing.

5. The sealing cartridge of claim 1, further comprising a support element for mounting the second seal in the receptacle housing.

6. The sealing cartridge of claim 5, wherein the support element has a slot that extends in a radial direction.

7. The sealing cartridge of claim 1, further comprising a finisher ring provided on a first housing end of the receptacle housing and/or on a second housing end of the receptacle housing.

8. The sealing cartridge of claim 7, wherein the finisher ring is fixed to the receptacle housing by a securing ring.

9. The sealing cartridge of claim 7, wherein the finisher ring has a detent for arresting the finisher ring axially on the receptacle housing.

10. The sealing cartridge of claim 7, wherein the finisher ring is press fit in the receptacle housing.

11. The sealing cartridge of claim 7, wherein the finisher ring is configured so that the securing ring is arrested in a self-acting manner.

12. The sealing cartridge of claim 11, wherein the finisher ring has an external groove, with a variable groove depth.

13. The sealing cartridge of claim 11, wherein the finisher ring is configured to receive the securing ring in a secure manner.

14. The sealing cartridge of claim 11, wherein the securing ring is an open circlip.

15. The sealing cartridge of claim 14, wherein the positioning element is received captively in the receptacle housing.

16. The sealing cartridge of claim 7, further comprising a securing element that fixes the finisher ring immovably in the receptacle housing.

17. The sealing cartridge of claim 1, wherein the shell face of the receptacle housing is configured for securely receiving a positioning element.

18. The sealing cartridge of claim 1, wherein the seal and the receptacle housing collectively form a sealing cartridge that is ready for assembly.

19. An injector assembly for an internal combustion engine, comprising an injector and a housing of the internal combustion engine, the injector being configured to be receivable in a receptacle opening of the housing and being movable axially along an injector axis, and a fuel supply chamber disposed between the injector and the housing and having a fuel supply opening for supplying the injector with fuel, a sealing cartridge for sealing the fuel supply chamber in a fluid-tight manner in relation to a receptacle chamber in which the sealing cartridge is received, the sealing cartridge having a receptacle housing configured to receive the injector therein, the receptacle housing having a first housing portion configured to receive a first seal on a shell face of said receptacle housing, and a second housing portion configured to receive a second seal on an internal face.

20. The injector assembly of claim 19, wherein the housing has at least one detent against which the sealing cartridge is positioned.

21. The injector assembly of claim 19, wherein the first housing portion of the sealing cartridge is configured to face the fuel supply chamber, and the second housing portion of the sealing cartridge is configured to face the receptacle chamber.

22. The injector assembly of claim 19, wherein the sealing cartridge is configured to be received in the housing.

23. The injector assembly of claim 19, further comprising an annular seal between the housing and the injector on a side of the sealing cartridge that is configured so as to face away from the fuel supply opening.

24. The injector assembly of claim 19, wherein the injector is a piezo injector.

25. The injector assembly of claim 19, wherein the injector is a magnetic injector.

26. The injector assembly of claim 19, wherein the injector is a piezo injector or magnetic injector configured for injecting water.

* * * * *